No. 858,152. PATENTED JUNE 25, 1907.
F. N. COFFMAN.
MIRROR SUPPORT.
APPLICATION FILED AUG. 30, 1906.
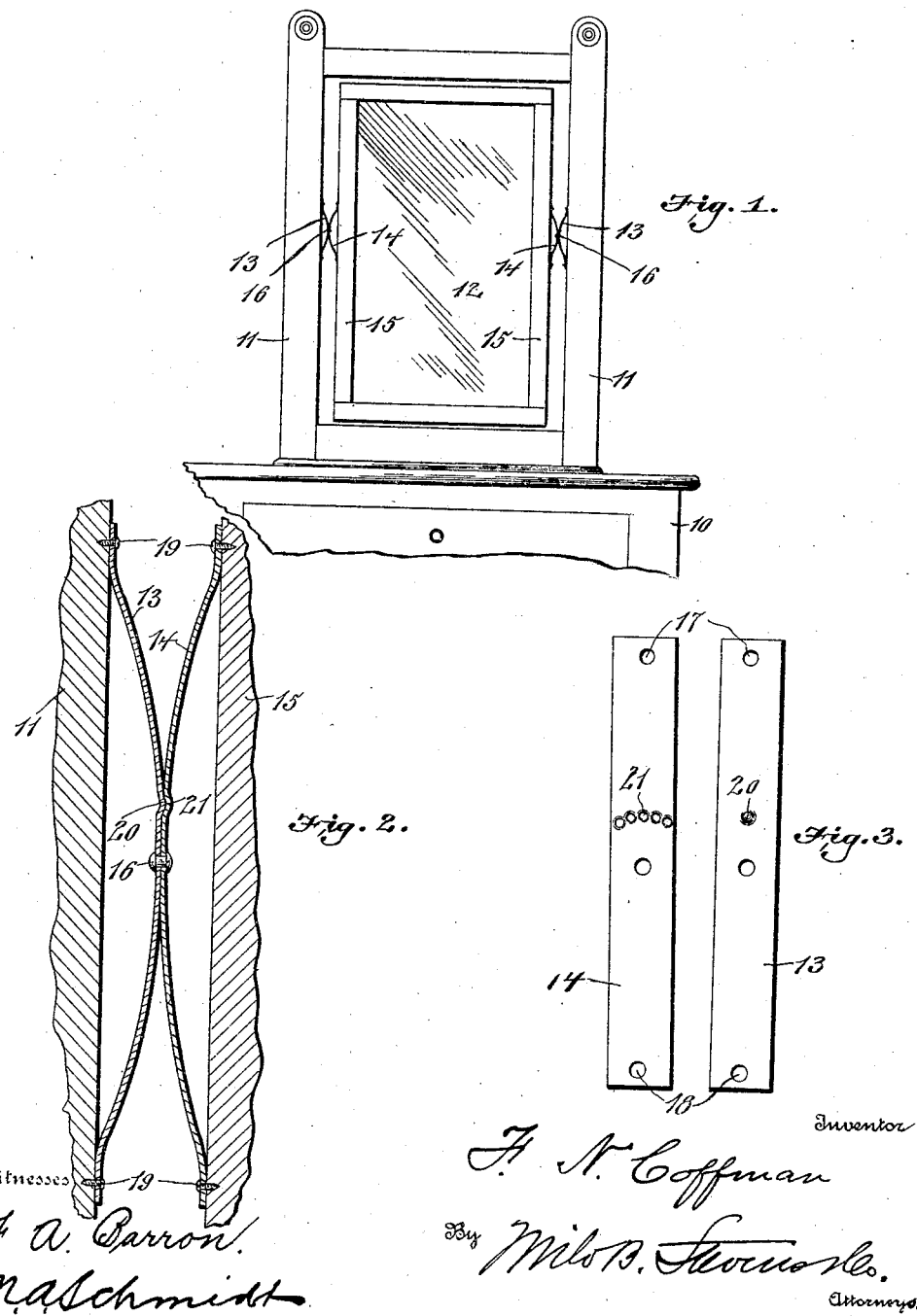

UNITED STATES PATENT OFFICE.

FRED NICHOLAS COFFMAN, OF WESTPLAINS, MISSOURI.

MIRROR-SUPPORT.

No. 858,152.  Specification of Letters Patent.  Patented June 25, 1907.

Application filed August 30, 1906. Serial No. 332,686.

*To all whom it may concern:*

Be it known that I, FRED NICHOLAS COFFMAN, a citizen of the United States, residing at Westplains, in the county of Howell and State of Missouri, have invented new and useful Improvements in Mirror-Supports, of which the following is a specification.

This invention is a mirror support, and more particularly a pivotal support for the swinging mirror of a dresser, bureau or other article of furniture.

The object of the invention is to provide a support for the mirror so that it can be readily tilted forwardly and rearwardly, and one which will also hold the mirror in adjusted position.

In the accompanying drawing Figure 1 is an elevation showing the application of the invention. Fig. 2 is an enlarged vertical section of the support. Fig. 3 is a face view of the two members of the support.

Referring specifically to the drawing, 10 denotes a portion of a dresser, bureau or similar article of furniture having uprights 11 between which the mirror 12 is pivotally supported to swing in a vertical plane.

The support comprises two pivotally connected members 13 and 14, respectively, which are flat bow-springs of sufficient strength to support the mirror. The member 13 is fastened near its ends to the inner edge of the upright 11, and extends outwardly therefrom, and the member 14 is similarly fastened to the outer edge of the frame 15 of the mirror 12. The members meet between the parts 11 and 15, and are pivotally connected by a rivet or bolt 16. Both members are provided with holes 17 and 18, respectively, for the passage of screws or other fastening means 19 whereby they are secured to the uprights and mirror frame. The holes 18 will be made large enough to permit a slight play of the members.

A lug 20 is struck up from one of the members, and the other member has a number of recesses 21 to receive the lug which, together with the friction between the contacting portions of the members, serves to hold the mirror in adjusted position.

By reason of the resiliency of the members, the lug is automatically engaged and disengaged when the mirror is tilted forwardly or rearwardly, and it can therefore be readily swung into the desired position, and in which it will be securely held.

The parts herein described can be cheaply produced and readily applied to the mirror.

I claim:—

The combination with a mirror and its supporting frame, of pivotally connected resilient strips secured to and extending from the mirror and the supporting frame respectively, said strips having stop lugs and recesses.

In testimony whereof I have signed my name to this specification in the presence of two subscribing witnesses.

FRED NICHOLAS COFFMAN.

Witnesses:
BEN M. ALSUP,
H. P. DAWES.